United States Patent [19]

Ohta et al.

[11] Patent Number: 5,198,167
[45] Date of Patent: Mar. 30, 1993

[54] PROCESS FOR PRODUCING FIBER MOLDING FOR FIBER-REINFORCED COMPOSITE MATERIALS

[75] Inventors: Tohru Ohta; Akimasa Daimaru; Masao Ichikawa; Hideyuki Fujishiro; Ryuichi Kubota; Takeyoshi Nakamura; Hisayoshi Harada; Hirotaka Koshitani; Tatsuya Suzuki; Teruo Hoshino, all of Saitama, Japan

[73] Assignee: Honda Giken Kogyo Kabushiki Kaisha, Tokyo, Japan

[21] Appl. No.: 429,839

[22] Filed: Oct. 31, 1989

[30] Foreign Application Priority Data

| Oct. 31, 1988 | [JP] | Japan | 63-275506 |
| Nov. 2, 1988 | [JP] | Japan | 63-278077 |
| Nov. 2, 1988 | [JP] | Japan | 63-278078 |
| Nov. 2, 1988 | [JP] | Japan | 63-278081 |
| Dec. 29, 1988 | [JP] | Japan | 63-333426 |

[51] Int. Cl.$^5$ .................. B29C 43/02; D21J 3/00
[52] U.S. Cl. .................. 264/86; 162/152; 162/157.1; 162/224; 162/227; 264/108; 264/119; 264/120; 264/294; 264/323; 264/325; 425/84
[58] Field of Search ............... 264/86, 87, 108, 109, 264/122, 119, 120, 571, 101, 517, 294, 324, 325, DIG. 75, 323; 425/84, 85; 162/145, 152, 218, 221, 224, 227, 228, 131, 157.1

[56] References Cited

U.S. PATENT DOCUMENTS

| 2,268,759 | 1/1942 | Martin | 264/120 |
| 3,655,863 | 4/1972 | Andersen et al. | 264/108 X |
| 3,809,736 | 5/1974 | Munk | 264/120 |
| 3,822,106 | 7/1974 | Bonet Sirera | 425/84 |
| 3,958,908 | 5/1976 | Schubart | 264/86 X |
| 4,014,969 | 3/1977 | Gorter et al. | 264/108 |
| 4,203,936 | 5/1980 | Kiwak et al. | 264/120 X |
| 4,213,928 | 7/1980 | Casselbrant | 264/120 X |
| 4,216,682 | 8/1980 | Ban et al. | 164/108 X |
| 4,476,916 | 10/1984 | Nusbaum | 164/108 X |
| 4,536,366 | 8/1985 | Inoue | 264/120 X |
| 4,559,194 | 12/1985 | Hegenstaller | 264/120 X |
| 4,587,707 | 5/1986 | Nishida et al. | 164/98 X |
| 4,702,870 | 10/1987 | Setterholm et al. | 264/120 X |
| 4,775,705 | 10/1988 | Parker et al. | 264/87 X |
| 4,786,366 | 11/1988 | Ito et al. | 264/108 X |
| 4,938,844 | 7/1990 | Ito et al. | 264/108 X |
| 4,995,444 | 2/1991 | Jolly et al. | 164/100 X |
| 4,997,608 | 3/1991 | Haldeman et al. | 264/120 |

FOREIGN PATENT DOCUMENTS

| 109241 | 5/1984 | European Pat. Off. | 264/108 |
| 2306507 | 9/1974 | Fed. Rep. of Germany | 264/120 |
| 45180 | 3/1983 | Japan | 264/120 |
| 57719 | 4/1984 | Japan | 264/108 |
| 2308822 | 12/1990 | Japan | 264/86 |
| 2103673 | 2/1983 | United Kingdom | 425/85 |
| 2126158 | 3/1984 | United Kingdom | 264/87 |

*Primary Examiner*—Karen Aftergut
*Attorney, Agent, or Firm*—Lyon & Lyon

[57] ABSTRACT

In a process for molding a fiber molding for a fiber-reinforced composite material with short fibers oriented in one direction, a slurry molding material having short fibers dispersed in a liquid is used, and pressing forces are applied to the molding material from two directions substantially perpendicular to each other within a mold, while removing the liquid.

14 Claims, 14 Drawing Sheets

PROCESS FOR PRODUCING FIBER MOLDING FOR FIBER-REINFORCED COMPOSITE MATERIALS

BACKGROUND OF THE INVENTION

1. Field of the Invention

The field of the present invention is fiber moldings for use in the production of fiber-reinforced composite materials such as fiber-reinforced metallic, plastic and ceramic members, and particularly processes for forming fiber moldings with short fibers oriented in one direction, such as silicon carbide whiskers, short carbon fibers and short alumina fibers.

2. Description of the Prior Art

There is such conventionally known processes for forming fiber moldings, wherein a slurry molding material containing short fibers dispersed in a liquid is molded using a compression molding process, a vacuum molding process or the like to produce a fiber molding, as disclosed in Japanese Patent Application Laid-open No. 166934/86.

In the fiber moldings produced by the above molding processes, the short fibers are oriented perpendicular to the pressing direction, but within the plane perpendicular the pressing direction, the short fibers are oriented randomly.

If the composite material is desired to be reinforced in an axial direction, then it is necessary to form a fiber molding with the short fibers oriented in the axial direction. This requirement, however, cannot be satisfied in the above prior art processes.

In addition, if the composite material includes an annular or semi-annular portion or the like provided in a portion thereof, then it is necessary to shape an annular portion or the like even in the fiber molding. In this situation, it is desirable that the short fiber in the annular portion or the like of the fiber molding be oriented along an arc of the annular portion or the like and that the volume fraction (Vf) of the short fiber be uniformly maintained over the entire annular portion or the like, for the purpose of improving the mechanical properties of the composite material. Such properties, however, cannot be obtained by the above prior art process.

When the strength of the composite material is intended to be improved in a particular portion the volume fraction of the short fiber in that portion of the fiber molding which corresponds to such portion of the composite material must be increased. Thereupon, there is employed means for secondarily pressing such portion of the fiber molding produced in the above process from the same direction as in the above molding operation.

In the fiber molding produced in this manner, however, the short fiber in such portion of the fiber molding is oriented at random within the plane perpendicular to the pressing direction and thus intertwined. For this reason, in some case, the molten matrix cannot sufficiently penetrate into such portions of the fiber molding during production of a composite material, and consequently, it is feared that defects may be produced in the resulting composite material.

A procedure used to form fiber moldings for fiber-reinforced composite materials having a hollow portion is to pour a slurry molding material consisting of short fibers dispersed in a liquid into a mold cavity and then form the fiber molding while removing the liquid through a porous core to shape the hollow portion.

Such porous cores have pores substantially uniformly dispersed over the whole thereof, and hence, the liquid permeability of the entire porous core is generally even. Consequently, when the molding material in the cavity is pressed during molding, the running of the molding material is developed preferentially in a section of the porous core closer to its upper end, resulting in a higher volume fraction of the short fiber in that section closer to the upper end, and in a lower volume fraction of the short fiber in a section closer to a base end of the porous core.

To obtain a fiber-reinforced metallic member reinforced with short fibers, wherein the flexibility of the shape and the volume fraction of the short fibers are increased and the short fibers are oriented in one direction, it is desirable to employ a single-step pressure casting process rather than a pressure casting process using a fiber molding. Such a technique, however, is still not developed at present.

SUMMARY OF THE INVENTION

It is an object of the present invention to provide a molding process of the type described above, whereby a fiber molding with short fibers oriented in a certain direction can be readily and reliably produced.

It is another object of the present invention to provide a molding process of the type described above, wherein while forming a fiber molding having an annular or semi-annular portion provided in a portion thereof, short fibers can be oriented along an arc of the annular portion or the like, and the volume fraction of the short fiber can be substantially uniformized over the entire annular portion or the like.

It is a further object of the present invention to provide a fiber molding of the type described above and a process for molding the same, wherein the volume fraction of short fibers in a particular portion of the fiber molding can be increased and the short fibers can be oriented in a certain direction to improve the permeability of the fiber molding to the molten matrix.

It is a yet further object of the present invention to provide a molding process of the type described above, wherein when a fiber molding having a hollow portion is formed using a porous core, the volume fraction of the short fiber can be substantially uniformized over the resulting entire fiber molding.

Further, it is an object of the present invention to provide a molding process of the type described above that can produce a fiber molding with its volume fraction of short fibers partially to varied.

Yet further, it is an object of the present invention to provide a process for producing a fiber-reinforced metallic member of the type described above wherein the flexibility of the metallic member shape and the volume fraction of short fibers are increased and the short fibers are oriented in a certain direction by use of a single pressure casting process.

To achieve the above objects, according to the present invention, there is provided a process for molding a fiber molding for a fiber-reinforced composite material with short fibers oriented in a certain direction, comprising preparing a slurry molding material having short fibers dispersed in a liquid, and applying pressing forces to the short fiber from two directions substantially perpendicular to each other within a mold, while removing the liquid.

In addition, according to the present invention, there is provided a process for molding a fiber molding for a fiber-reinforced composite material having an annular or semi-annular portion provided in a portion thereof, comprising a first step of pouring a slurry molding material having short fibers dispersed in a liquid into a first mold and then applying a primary pressing force to the molding material while removing the liquid to form an intermediate product having an annular or semiannular portion, the primary pressing direction being established in a direction parallel with the center line of the annular or semi-annular portion, and a second step of placing the intermediate product into a second mold with a circular or semi-circular float fitment fitted in a semi-circular recess in the annular or semi-annular portion of the intermediate product, and then applying a secondary pressing force to the intermediate product from a direction substantially perpendicular to the primary pressing direction, while removing the liquid and permitting the float fitment to slide within the second mold.

Further, according to the present invention, there is provided a process for molding a fiber molding for a fiber-reinforced composite material, comprising a first step of pouring a slurry molding material comprising short fibers dispersed in a liquid into a mold and then applying a primary pressing force to the molding material within the mold from a primary pressing direction while removing the liquid, thereby forming an intermediate product, and a second step of applying a secondary pressing force to a portion of the intermediate product from a direction substantially perpendicular to the primary pressing direction.

Yet further, according to the present invention, there is provided a fiber molding for a fiber-reinforced composite material, which is formed of a short fiber, wherein the volume fraction (Vf) of short fibers in one portion are set higher than that of short fibers in the other portion, and the short fibers in the one portion are oriented in a certain direction.

Further, according to the present invention, there is provided a process for molding a fiber molding for a fiber-reinforced composite material having a hollow portion, comprising pouring a slurry molding material comprising short fibers dispersed in a liquid into a cavity in a mold and then molding the molding material while discharging the liquid through a porous core for shaping the hollow portion, thereby forming the fiber molding, wherein the liquid permeability of the porous core is partially varied.

Further, according to the present invention, there is provided a process for molding a fiber molding for a fiber-reinforced composite material, comprising pouring a slurry molding material comprising short fibers dispersed in a liquid into a cavity in a mold and then molding the molding material while discharging the liquid through a large number of drainage holes opened into the cavity, wherein the density of the drainage holes opened into the cavity is partially varied, thereby forming the fiber molding.

Further, according to the present invention, there is provided a process for producing a fiber-reinforced metallic member, comprising of a step of placing an aggregate of short fibers into a mold cavity and then pouring molten metal into the cavity to form a matrix, a step of slowly pressing the molten metal from a first direction to impregnate the aggregate with the molten metal, a step of rapidly pressing the molten metal from the first direction and a second direction substantially perpendicular to the first direction to achieve the shaping, and a step of maintaining the pressing forces constant on the molten metal from the first and second directions.

With the above processes, the short fibers are oriented perpendicularly to the pressing force and at random within the plane perpendicular to the pressing direction by application of the pressing force from a certain direction. Application of a second pressing force perpendicular to the first pressing force causes the short fibers within the plane perpendicular to the first pressing direction to be oriented perpendicular to the second pressing force within the plane. This makes it possible to produce a fiber molding with short fibers oriented in one direction.

In addition, by using the slurry molding material, the short fibers contained therein are pressed through the liquid, and therefore, migration of the fiber through the slurry is smooth. This ensures that a fiber molding with the short fibers can be produced with less damage.

If the circular or semi-circular float fitment is fitted into the circular hole in the annular or semicircular recess in the semi-annular portion in the intermediate product, and if the secondary pressing is conducted while permitting the float fitment to slide within the second mold in the above manner, the annular portion or the like is secondarily pressed substantially evenly over the whole thereof, so that the short fibers are oriented along the arc of the annular portion or the like, and the volume fraction of the short fibers is substantially uniformized over the entire annular portion or the like.

If a secondary pressing force is applied to a portion of the intermediate product as described above, it is possible to produce a fiber molding with short fibers in such portion oriented in one direction.

If the liquid permeability of the porous core is partially varied as described above, the running of the molding material can be properly adjusted to produce a fiber molding with a volume fraction of short fibers generally uniformized over the whole thereof. It is also possible to produce a fiber molding with the volume fraction of short fibers partially varied.

If the density of drainage holes distributed is partially varied as described above, the running of the molding material is vigorous in the regions of higher density, as compared with that in regions of lower distributed density, and as a result, the volume fraction of short fibers in regions of higher distributed density is higher than that in regions of lower distributed density. This provides a fiber molding with partially varied volume fractions of short fibers.

If the molten metal is slowly pressed in the process for producing a fiber-reinforced metallic member, permeation of the molten metal into the short fibers is reliably provided. If the shaping of the metallic member is then conducted, the fiber volume fraction in and the shape of the metallic member are determined at this stage. In this case, the aggregate of the short fiber is impregnated with the molten metal prior to shaping, and therefore, cracks are not produced in the resulting member.

The short fibers exhibit a phenomenon of orientation perpendicular to the pressing direction, and hence, the application of pressing forces to the short fibers from a first and second direction substantially perpendicular to each other makes it possible to produce a metallic member with short fibers oriented in one direction.

Further, the generation of voids is prevented, and at the same time, a forging effect is obtained by maintaining the pressing force from the first and second directions constant. This provides a densification of the metallic structure of the matrix and increased adhesion to the short fiber.

The above and other objects, features and advantages of the invention will become apparent from a reading of the following detailed description of the preferred embodiments taken in conjunction with the accompanying drawings.

BRIEF DESCRIPTION OF THE DRAWINGS

FIGS. 1 and 2A to 2E illustrate a first embodiment, wherein,

FIG. 1 is a perspective view of a fiber molding;

FIGS. 2A to 2E are views helpful for explaining the molding steps in the first embodiment.

FIGS. 4 and 5A to 5E illustrate a third embodiment, wherein,

FIG. 4 is a perspective view of a fiber molding;

FIGS. 5A to 5E are views helpful for explaining the molding steps;

FIGS. 7 to 11 illustrate a fifth embodiment, wherein

FIG. 7 is a perspective view of a fiber molding;

FIG. 8 is a view for explaining one molding step;

FIG. 9 is a graph illustrating a relationship between the volume fraction of a silicon carbide whisker (which will be referred to as an SiC whisker hereinafter) and the pressing force, FIG. 10 is a graph illustrating a relationship between the volume fraction of SiC whiskers and the fillability of a matrix;

FIG. 11 is a graph illustrating a relationship between the volume fraction of SiC whiskers and the stress at fracture;

FIGS. 12 to 14 illustrate a sixth embodiment, wherein

FIG. 12 is a perspective view of a fiber molding;

FIG. 13 is a view for explaining a one molding step process;

FIG. 14 is a sectional view of a porous core; and

FIGS. 15 and 16 illustrate a seventh embodiment, wherein

FIG. 15 is a perspective view of a fiber molding;

FIG. 16 is a view for explaining one molding step;

FIGS. 17 to 20 illustrate an eighth embodiment, wherein

FIG. 17 is a perspective view of a fiber-reinforced metallic member;

FIG. 19 is a graph illustrating the courses of movements of an upper pressing punch and first and second lateral pressing punches in a producing process; and FIG. 20 is a view illustrating the oriented state of short fibers.

DESCRIPTION OF THE PREFERRED EMBODIMENTS

Figure 1:
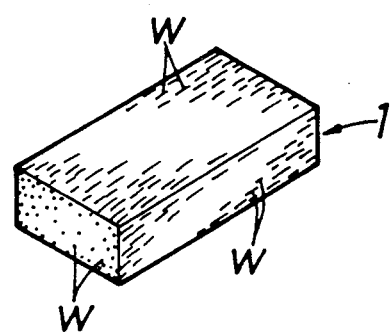

FIGS. 1 and 2A to 2E illustrate a first embodiment. FIG. 1 illustrates a rectangular parallelepiped fiber molding 1. SiC whiskers w as short fibers forming the fiber molding 1 are oriented in one direction, e.g., lengthwise in the illustrated embodiment.

The fiber molding 1 is formed by a procedure which will be described below.

SiC whiskers (made under a trade name of TOKAMAX by Tokai Carbon Co., Ltd.) are dispersed into a liquid such as water, an organic solvent, water containing an inorganic binder, an organic solvent containing an inorganic binder and the like to prepare a slurry molding material.

As shown in FIGS. 2A to 2E, a mold 2 comprises a mold body 4 including a cavity 3 opened at its upper side and a pressing punch 5 slidably received in the cavity 3. A plurality of drainage holes 6 are opened in a bottom surface of the cavity in the mold body 4, and inlet openings of the drainage holes 6 are covered with a filter 7.

Figure 2A:
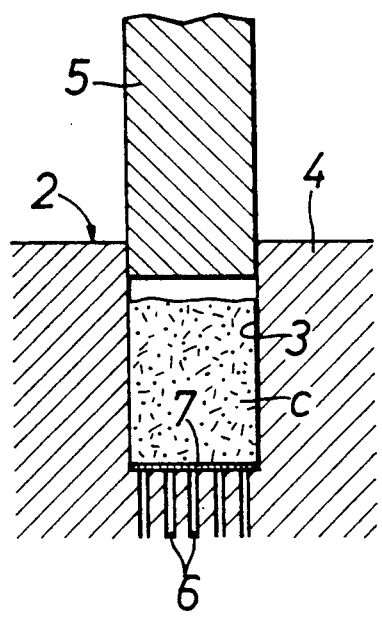

As shown in FIG. 2A, a predetermined amount of the molding material c is poured into the cavity 3. Some of the liquid contained in the molding material c is discharged through the drainage holes 6.

Figure 2B:
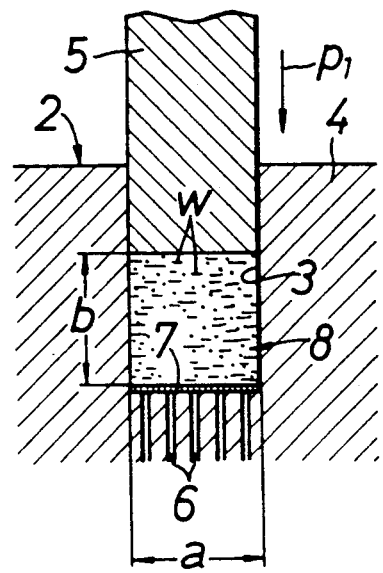

As shown in FIG. 2B, after a predetermined amount of the liquid has been discharged, the pressing punch 5 is moved down to primarily press the molding material c in a pressing direction $p_1$ while removing the liquid, thereby forming an intermediate product 8 having a width a and a height b equal to each other. The reason why the width a and the height b are equalized to each other in this manner is that a pressing operation is conducted again using the same mold 2 in a manner which will be described hereinafter. The volume fraction (Vf) of the SiC whiskers in the intermediate product 8 at this is of 11.2%.

Figure 2C:
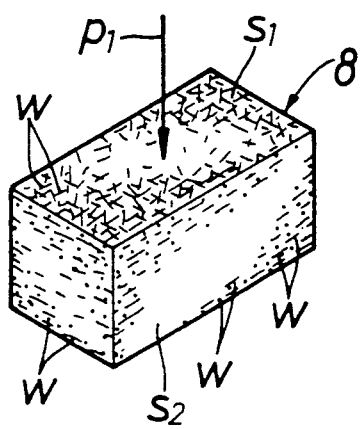

As shown in FIG. 2C, the intermediate product 8 is removed from the cavity 3. In this intermediate product 8, the SiC whiskers w are oriented perpendicular to the pressing direction $p_1$ and are oriented at random within the plane perpendicular to the direction $p_1$, including a primarily pressed surface $s_1$, by the primary pressing operation in the pressing direction p1.

Figure 2D:
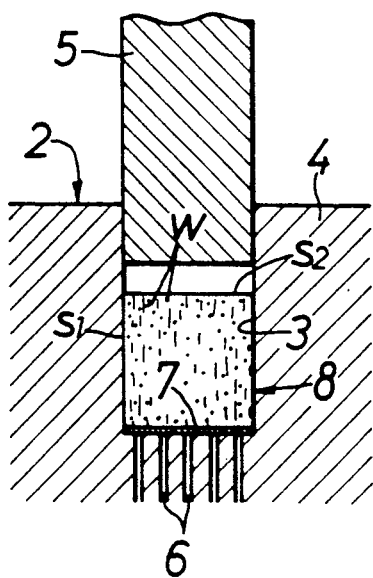

As shown in FIG. 2D, the intermediate product 8 is rotated through 90° about a lengthwise center line from an attitude provided after the primary pressing operation, and then placed again into the cavity 3 in the mold 2 with a surface $s_2$ to be secondarily pressed and perpendicular to the primarily pressed surface $s_2$ being turned upward.

Figure 2E:
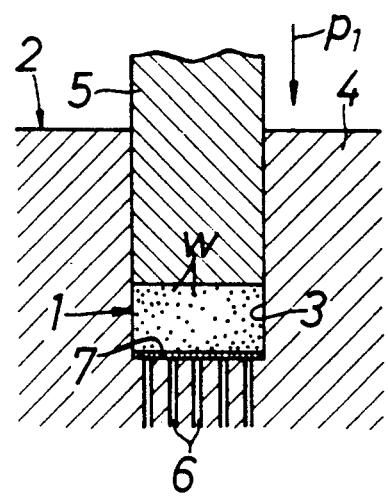

As shown in FIG. 2E, the pressing punch 5 is moved down to provide a secondary pressing of the intermediate product 8 in the pressing direction $p_1$, thus removing the liquid and thereby giving a fiber molding 1 having a volume fraction of SiC whiskers w of 20%.

The secondary pressing operation causes the intermediate product 8 to be secondarily pressed in a direction, displaced in phase through 90° from the primary pressing direction and hence, whiskers perpendicular to the pressing direction $p_1$ are maintained as they are, whereas any whiskers that are not perpendicular to the pressing direction $p_1$ are reoriented so that they are perpendicular to the pressing direction $p_1$, while being restrained within the plane perpendicular to the primary pressing direction. As a result, the SiC whiskers w are all oriented in one direction.

The above fiber molding 1 and an aluminum alloy (a material corresponding to JIS AC2B) were used to produce a composite material A in a casting manner under conditions of a mold temperature of 320° C., a molten metal temperature of 750° C. and a pressing force of 850 kg/cm².

After completion of the casting, the composite material A was subjected to a thermal treatment and test pieces were cut off the resulting composite material A so that the strength of the SiC whiskers in the direction of orientation could be determined. These test pieces were subjected to a tensile test the results of which are given in the following table.

For comparison purposes, a fiber molding having a 20% volume fraction of SiC whiskers, and wherein the SiC whiskers were oriented at random within a plane in the same manner as described in the above intermediate product 8, was used to produce a composite material B in a casting manner and under the same conditions just described.

After casting, the composite material 8 was subjected to a thermal treatment and test pieces were cut off the thermally treated composite material B and subjected to a similar tensile test.

|  | Composite A (kg/mm2) | Composite B (kg/mm2) |
| --- | --- | --- |
| Young's modulus | 11,500 | 10,500 |
| Tensile strength | 62.5 | 55.3 |
| 0.2% Load bearing ability | 42.0 | 38.5 |

As apparent from the above table, composite A has a higher strength than composite B, which is an effect of orientating the SiC whiskers in one direction.

Figure 3A:
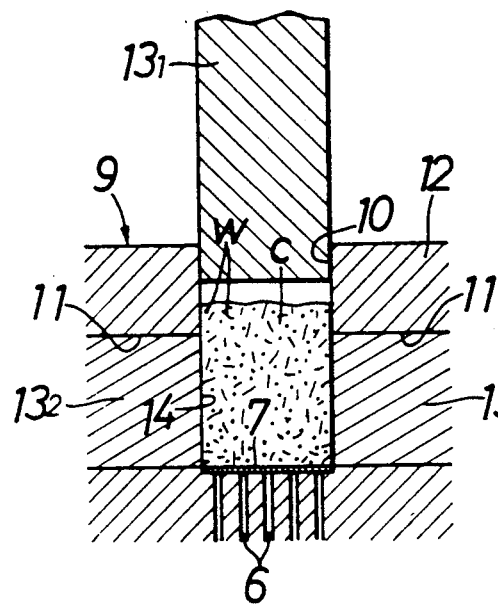
FIGS. 3A to 3C are views helpful for explaining the molding steps in a second embodiment.
Figure 3B:
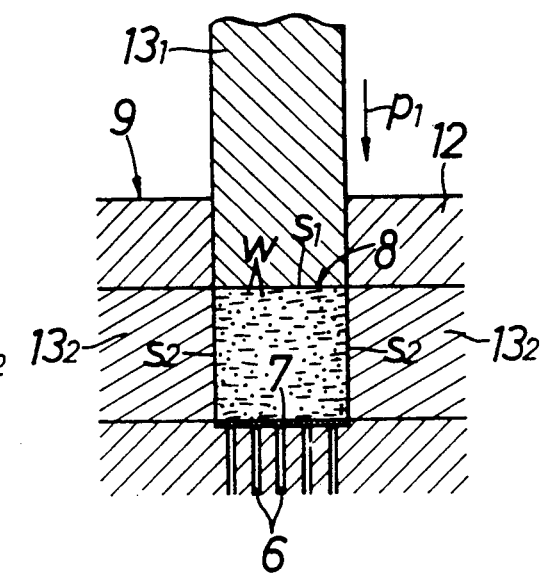
Figure 3C:
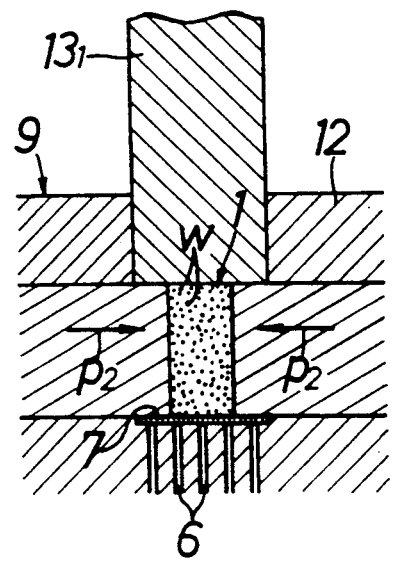

FIGS. 3A to 3C illustrate a second embodiment in which the same fiber molding 1 as described above is formed.

A mold 9 comprises a mold body 12 having a longitudinal bottomed hole 10 extending vertically, and a pair of transverse holes 11 extending horizontally so that they are opened on opposite side surfaces of the bottom of the longitudinal hole 10, a first pressing punch $13_1$ slidably received in the longitudinal hole 10 and having a pressing direction $p_1$, and a pair of second pressing punches $13_2$ slidably received in the transverse holes 11 respectively and having a pressing direction $p_2$ perpendicular to the direction $p_1$. A cavity 14 is defined by the longitudinal hole 10 and both of the second pressing punches $13_2$.

The procedure of forming the fiber molding 1 comprises pouring a molding material c into the cavity 14 (FIG. 3A), primary pressing the molding material from the pressing direction $p_1$ by operation of the first pressing punch $13_1$ (FIG. 38), and then pressing the resulting material from the secondary pressing direction $p_2$ by operation of the second pressing punches $13_2$ (FIG. 3C).

In this case, it is possible to employ one of the following pressing techniques: a technique in which the first pressing punch $13_1$ and both second pressing punches $13_2$ are operated concurrently; a technique in which both second pressing punches $13_2$ are operated concurrently or alternately and then the first pressing punch $13_1$ is operated; or a technique wherein the following operations are repeated: first, one of the second pressing punches $13_2$ is operated, then the other is operated, and finally, the first pressing punch $13_1$ is operated.

FIGS. 4 and 5A to 5E illustrate a third embodiment.

Figure 4:
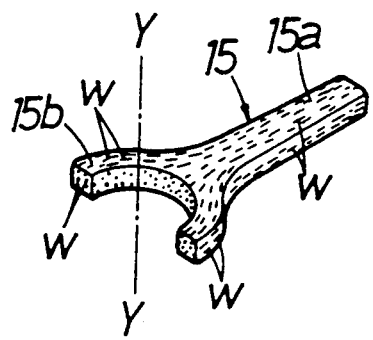

FIG. 4 shows a fiber molding 15 used for the casting of a connecting rod for an internal combustion engine. In a rod reinforcing portion 15a of the fiber molding 15, SiC whiskers w are oriented lengthwise. In a larger end reinforcing portion 15b, which has a semi-annular portion located at one end of the rod reinforcing portion 15a, the SiC whiskers w are oriented substantially along its arc.

The fiber molding 15 is formed by a procedure which will be described hereinafter.

Figure 5A:
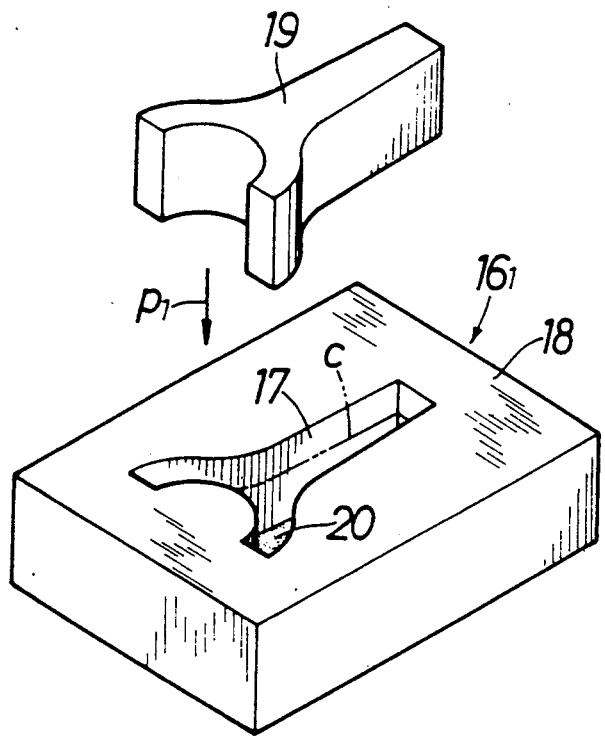

Referring to FIG. 5A, a first mold $16_1$ has a fiber molding shape with an axis Y—Y of a crank pin hole in the larger end reinforcing portion 15b being turned vertically and comprises a mold body 18 including a mold cavity 17 open at its upper side, and a pressing punch 19 slidably received in the mold cavity 17. A plurality of drainage holes (not shown) extend from the bottom surface of the mold cavity 17 through the mold body 18. The inlet openings of the drainage holes are covered with a filter 20.

Figure 5B:
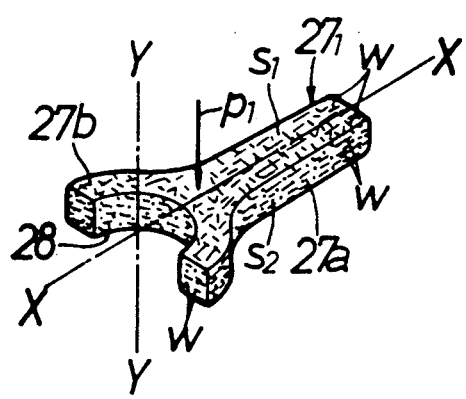
Figure 5C:
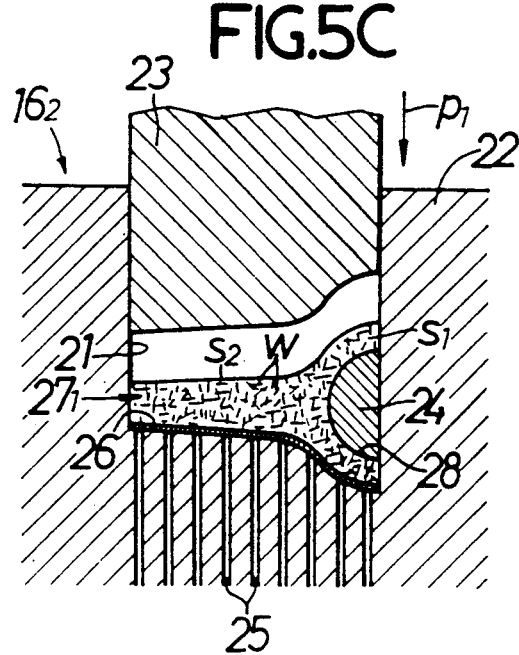

Referring to FIG. 5C, a second mold $16_2$ has a shape of the fiber molding such that a primary intermediate product formed in the first mold $16_1$ can be placed into the second mold with the axis of crank pin hole in its larger end reinforcing portion 15b being turned horizontally. The second mold $16_2$ comprises a mold body 22 including a mold cavity 21 open at its upper side, and a pressing punch 23 slidably received in the cavity 21. A semi-circular float fitment 24 fitted in a semicircular recess 28 of the larger end reinforcing portion 15b of the intermediate product is additionally used during molding. A plurality of drainage holes 25 extended from a bottom surface of the mold cavity 21 through the mold body 22. The inlet openings of the drainage holes 25 are covered with a filter 26.

As shown in FIG. 5A, a molding material c of the same construction as described above is poured into the mold cavity 17 in the first mold $16_1$. Some portion of the liquid contained in the molding material c is discharged through the filter 20 and through the drainage holes. After a predetermined amount of the liquid has been discharged, the pressing punch 19 is moved down to press the molding material c from the primary pressing direction $p_1$ while removing the liquid, thereby providing a primary intermediate product having a volume fraction of SiC whiskers of 11.2%.

As shown in FIG. 5B, the primary intermediate product $27_1$ is removed from the cavity 17. The primary intermediate product 27 includes a rod reinforcing portion 27a and a larger end reinforcing portion 27b. In this intermediate product $27_1$, the SiC whiskers w therein are oriented perpendicular to the pressing direction $p_1$ and are oriented at random within the plane perpendicular to the direction $p_1$ including a primarily pressed surface $s_1$.

As shown in FIG. 5C, the semi-circular fitment 24 is fitted into the semi-circular recess 28 in the primary intermediate product $27_1$. Then, the primary intermediate product $27_1$ is rotated through 90° about a lengthwise center line X—X of the rod reinforcing portion 27a from an attitude provided after the primary pressing operation and then is placed into the cavity 21 in the second mold $16_2$ with the axis Y—Y of the crank pin hole in the larger end reinforcing portion 27b turned horizontally. Thus, the surface to be secondarily pressed $s_2$ of the primary intermediate product $27_1$ is a surface perpendicular to the primarily pressed surface $s_1$.

Figure 5D:
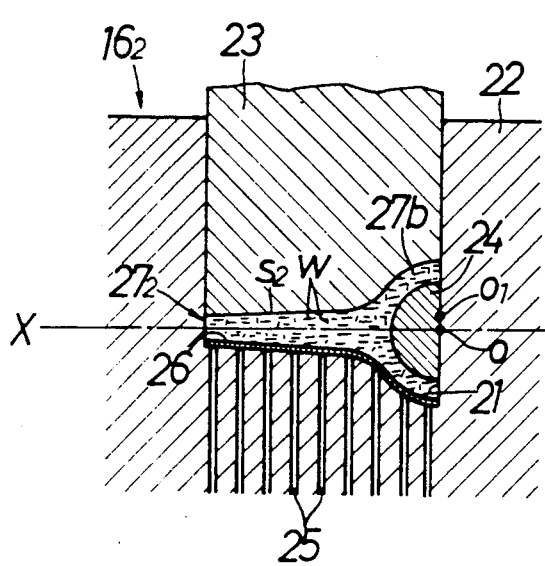

As shown in FIG. 5D, the pressing punch 23 is moved down to secondarily press the primary intermediate product 27 from the pressing direction $p_1$ while removing the liquid, thereby providing a secondary intermediate product $27_2$ having a volume fraction of SiC whiskers of 15.6%. At this time, the float fitment 24 slides on an inner cavity 21 to accept the secondary pressing.

This secondary pressing operation causes the primary intermediate product $27_1$ to be secondarily pressed from a direction displaced in phase through 90° from the primary pressing direction, and hence, SiC whiskers w perpendicular to the pressing direction $p_1$ are maintained as they are, whereas any SiC whiskers w that are not perpendicular to the pressing direction $p_1$, are oriented so that they are perpendicular or almost perpendicular to the pressing direction.

Figure 5E:
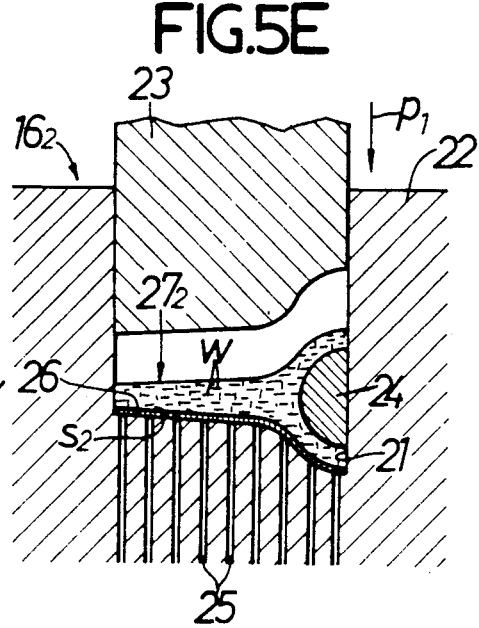
Figure 6:
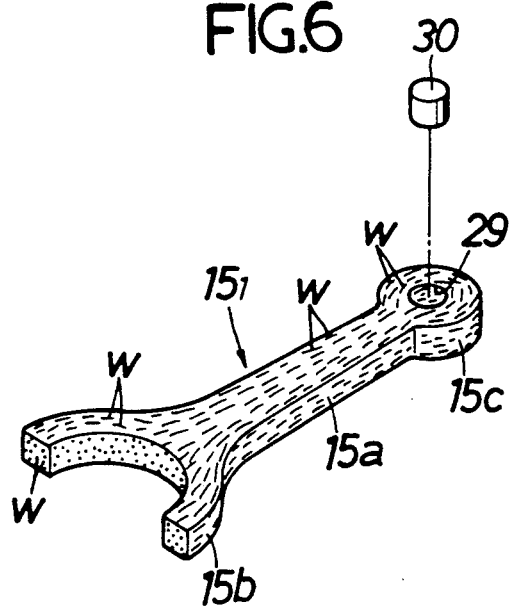
FIG. 6 is a perspective view of a fiber molding in a fourth embodiment.

As shown in FIG. 5E, the secondary intermediate product $27_2$ provided in the step shown in FIG. 5D is rotated through 180° about the lengthwise center line X—X of the rod reinforcing portion 27a from an attitude provided after the secondary pressing operation to turn the secondarily pressed surface $s_2$ downwardly and is then placed again into the cavity 21 in the second mold $16_2$. Subsequently, the pressing punch 23 is moved down to provide a tertiary pressing of the secondary intermediate product $27_2$ from the pressing direction $p_1$ while removing the liquid, thereby giving a fiber molding 15 having a volume fraction of SiC whiskers of 20%. The tertiary pressing operation causes the SiC whiskers w not perpendicular to the pressing direction to be oriented perpendicularly to the pressing direction.

The reason why the secondary and tertiary pressings are conducted as described above is that if the volume fraction is increased from 11.2% to 20% by the single pressing operation, the float fitment 24 is stopped in front of its center o located on the lengthwise center line X—X of the rod reinforcing portion 27a, i.e., at a position ol, as viewed in FIG. 5D, so that the volume fraction in the portion above the float fitment and closer to the pressing punch 23 is higher than that in the portion below the float fitment. Two pressing run operations, however, conducted as described above enable the entire larger end reinforcing portion 27b to be pressed uniformly, resulting in a uniformized volume fraction over the whole thereof.

In the above-described pressing process, the pressing operation may be completed, in some cases, after completion of the secondary pressing step depending upon the volume fraction of the fiber molding 15. Alternatively, the secondary and tertiary pressing operations may be repeated alternately or conducted concurrently. Furthermore, although the second mold $16_2$ has been used even in the tertiary pressing operation in the above embodiment, the tertiary pressing operation may be carried out using an exclusive third mold (not shown).

Furthermore, the above-described pressing process is applicable to the formation of a fiber molding $15_1$ having a smaller end reinforcing portion 15c as an annular portion at the other end of the rod reinforcing portion 15a. In this case, a circular float fitment 30 is fitted into a circular hole 29 in the smaller end reinforcing portion 15c in the secondary pressing operation or the secondary and tertiary pressing operations. This makes it possible to orient the SiC whisker w along the arc, of the smaller end reinforcing portion 15c as in the larger end reinforcing portion 15b.

In addition, the above pressing process is not limited to the formation of fiber moldings for connecting rods. It can also be applied to the formation of a fiber molding for a rocker arm having a through hole for a rocker shaft.

While the pressing operations have been described as being conducted from the two directions perpendicular to each other in the individual previous embodiments, it will be understood that the pressing operations are not limited to directions completely perpendicular to each other, and thus pressing may be carried out in directions nearly perpendicular to each other.

FIGS. 7 to 11 illustrate a fifth embodiment.

Figure 7:
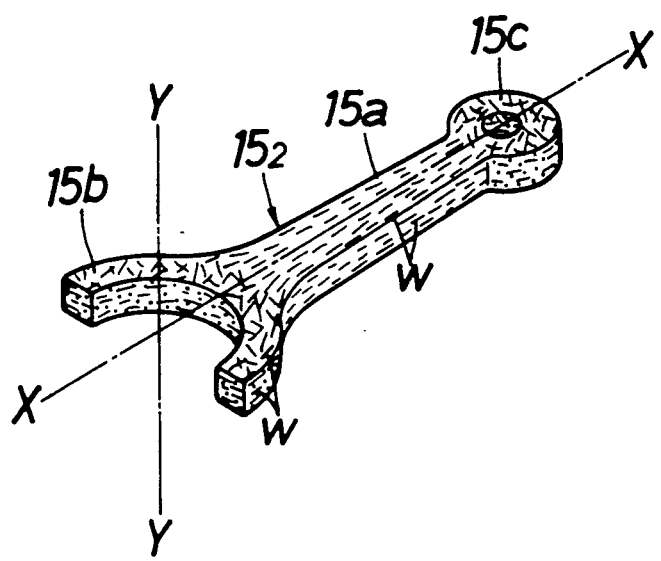

FIG. 7 shows a fiber molding $15_2$ for use in a casting of a connecting rod for an internal combustion engine. In a rod reinforcing portion 15a of the fiber molding $15_2$, SiC whiskers w are oriented lengthwise along axis X—X. In the larger end reinforcing portion 15b and the smaller end reinforcing portion 15c, SiC whiskers w are oriented at random within a plane perpendicular to the axis Y—Y of a crank pin hole. Furthermore, the volume fraction of SiC whiskers w in the rod reinforcing portion 15a is higher than those in the larger and smaller end reinforcing portions 15b and 15c.

The fiber molding $15_2$ is formed by a procedure which will be described below.

Figure 8:
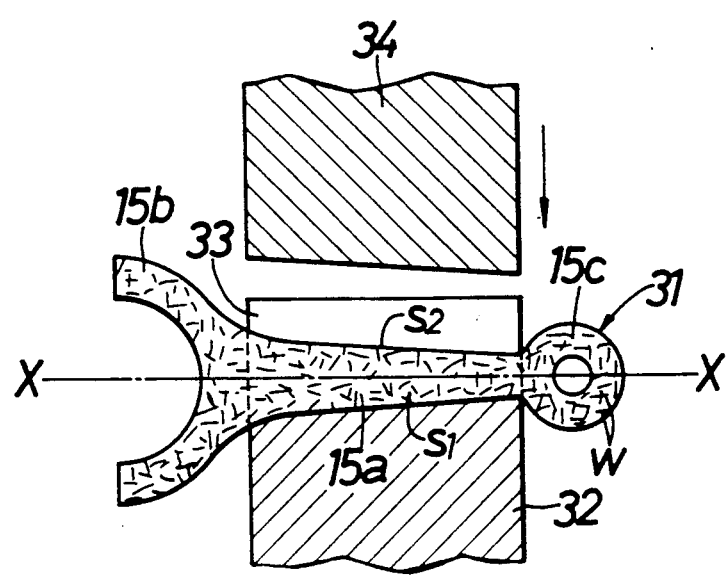

First, an intermediate product 31 corresponding to the primary intermediate product $27_1$ shown in FIG. 5B in the previous embodiment is formed as shown in FIG. 8. In this intermediate product 31, the SiC whiskers w are oriented at random within a plane including a primarily pressed surface $s_1$ perpendicular to a pressing direction and thus a direction of the crank pin hole axis Y—Y.

Then, the intermediate product 31 is rotated through 90° about a longitudinal center line X—X of the rod reinforcing portion 15a from an attitude provided after the primary pressing operation as in FIG. 15A, and then the rod reinforcing portion 15a thereof is fitted into a retaining groove 33 in the bearer 32. Thus, the surface to be secondarily pressed $s_2$ of the intermediate product 31 is a surface perpendicular to the primarily pressed surface $s_1$.

Thereafter, the pressing punch 34 is moved down to secondarily press surface $s_2$ of the intermediate product 31 while removing the liquid. The secondary pressing operation may be repeated with the intermediate product 31 rotated through 180° about the lengthwise center line X—X of the rod reinforcing portion 15a, if necessary.

As a result of secondary pressing operation, the SiC whiskers w are oriented lengthwise along axis X—X the rod reinforcing portion 15a, and the volume fraction of SiC whiskers w in the rod reinforcing portion 15a is higher than the volume traction in the larger and smaller end reinforcing portions 15b and 15c.

Figure 9:
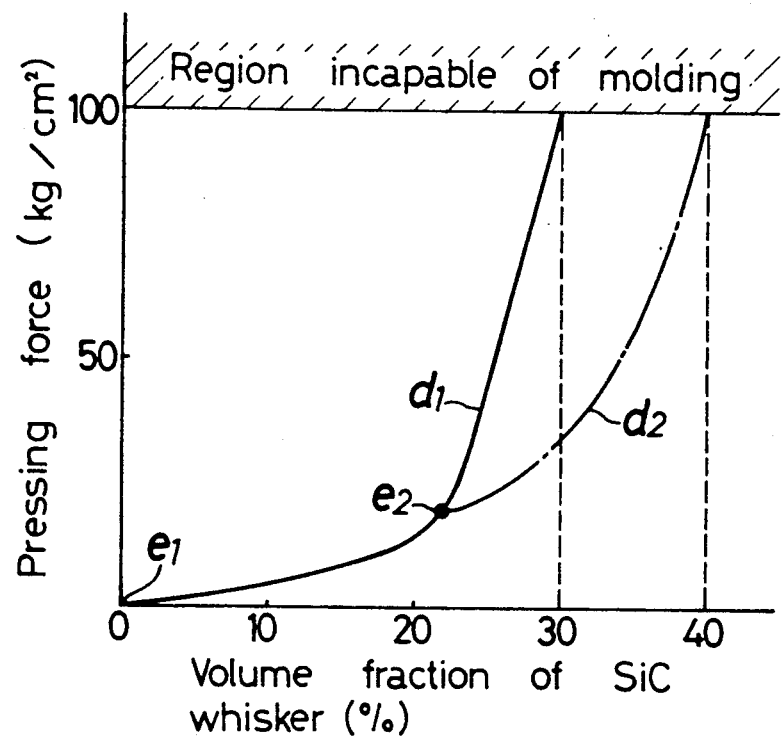

When the fiber molding having SiC whiskers oriented at random within a plane is formed by a single pressing operation, the volume fraction of the SiC whiskers varies as indicated by a line $d_1$ with respect to the pressing force, as shown in FIG. 9.

Likewise, when the primary and secondary pressing operations have been performed in the above-described manner, the volume fraction of SiC whiskers varies in the range of bound by points $e_1$ and $e_2$ on line $d_1$ with respect to the pressing force in the primary pressing operation, and the volume fraction of SiC whiskers varies as indicated by a line $d_2$ in the secondary pressing operation.

As apparent from comparing line $d_2$ with line $d_1$ in FIG. 9, if the primary and secondary pressing operations are conducted, the volume fraction of SiC whiskers in the fiber molding can be increased above the volume fraction achieved in a single pressing operation even though the same pressing force is used in the secondary pressing operation. When the primary and secondary pressing operations have been conducted with a moldable upper limit value of the pressing force of 100 kg/cm², the highest volume fraction of 40% is obtained. On the other hand, when a single pressing operation has been conducted, the highest volume fraction is reduced to 30%.

Using the above-described fiber molding $15_2$, a pressure casting process was utilized to produce a connecting rod having a matrix of an aluminum alloy.

Figure 10:
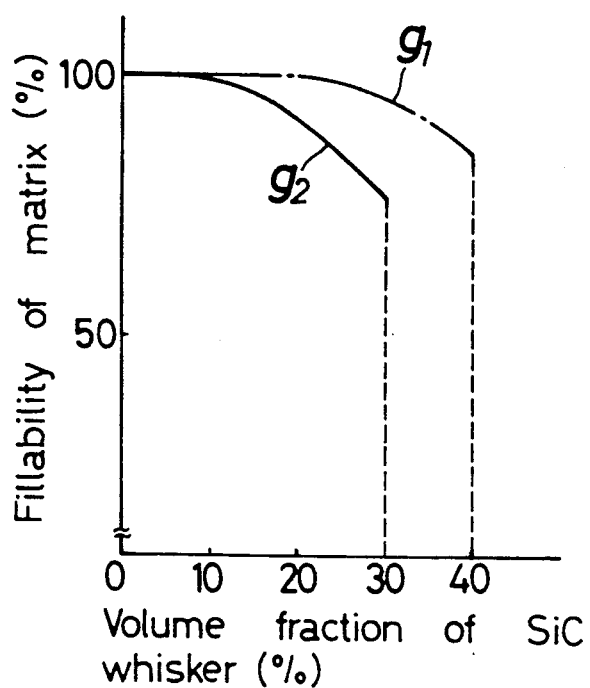

FIG. 10 illustrates a relationship between the volume fraction of SiC whiskers in the rod reinforcing portion of the fiber molding and the fillability of the matrix. In FIG. 10, the line $g_1$ represents the relationship obtained when the SiC whiskers have been oriented in one direction, and the line $g_2$ represents the relationship obtain when the SiC whiskers have been oriented at random within the plane perpendicular to the primary pressing direction.

As apparent from the line $g_1$ in FIG. 10, even if the volume fraction of SiC whiskers is high, the fillability of the matrix may be improved if the SiC whiskers are oriented in one direction.

Figure 11:
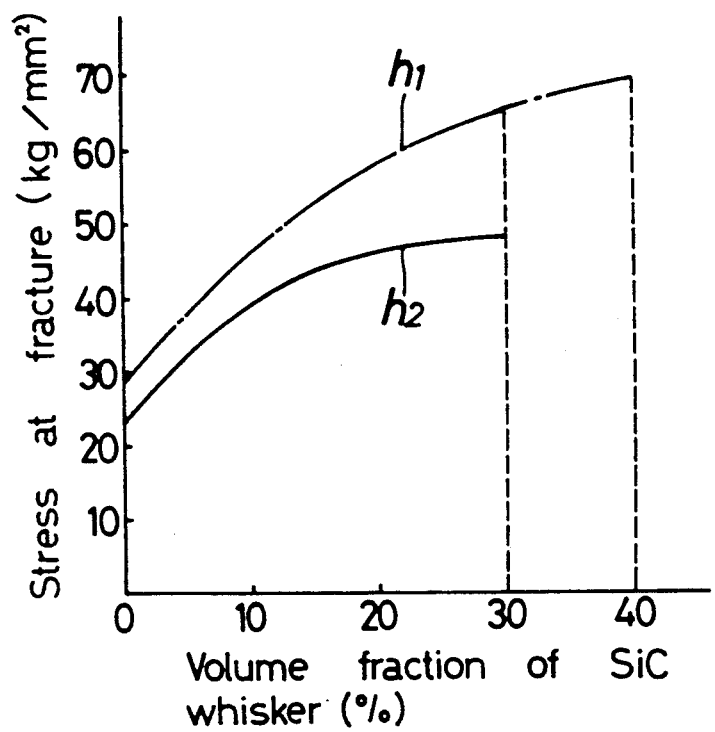

FIG. 11 illustrates a relationship between the volume fraction of SiC whiskers in the rod reinforcing portion of the fiber molding and the stress at rupture. In FIG. 11, the line $h_1$ represents the relationship obtained when SiC whiskers have been oriented in one direction, and the line $h_2$ represents the relationship obtained when SiC whiskers have been oriented at random within the plane perpendicular to the primary pressing direction.

It can be seen by comparison of lines $h_1$ and $h_2$ in FIG. 11 that in the case of line $h_1$, increased strength is obtained even though the same volume fraction of SiC whiskers is used as in line $h_2$ through the orientation of the SiC whisker in the rod reinforcing portion in one direction and by the improvement in fillability of the matrix as a result of such orientation in one direction.

In addition, the maximum strength of the rod reinforcing portion in the case of the line $h_1$ as compared with line $h_2$ may substantially increased by the orientation of SiC whiskers in one direction. This also leads to improved fillability of the matrix and an increase in volume fraction of SiC whiskers.

Figure 12:
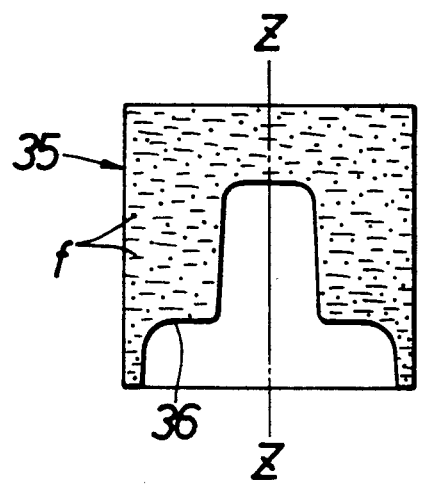
Figure 13:
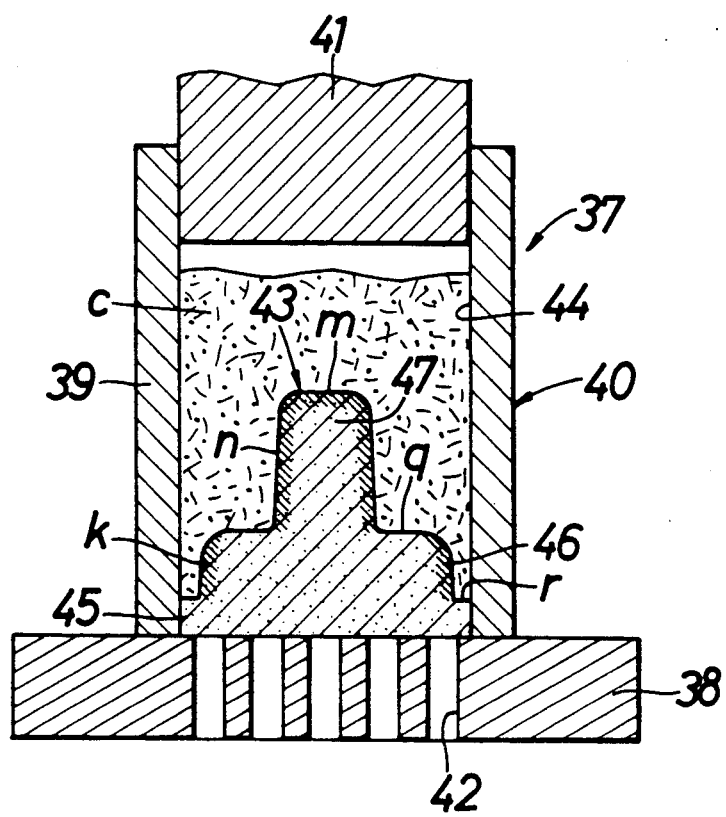
Figure 14:
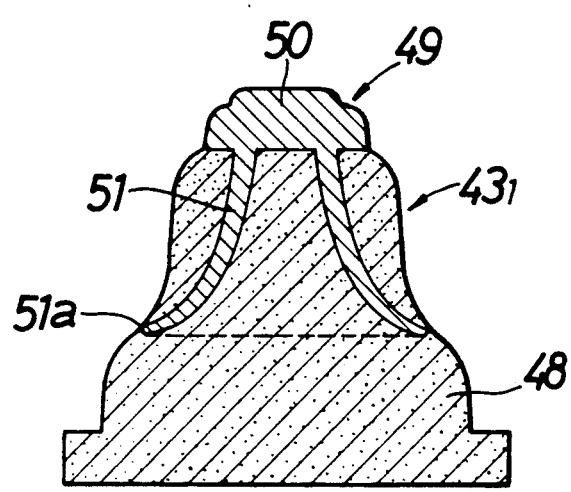

FIGS. 12 to 14 illustrate a sixth embodiment.

FIG. 12 shows a fiber molding 35 for use in casting of a piston for an internal combustion engine. The fiber molding 35 is formed of a short fiber f and includes a hollow portion 36 opened at one end. The short fibers are oriented in a substantially uniform manner at random within a plane perpendicular to a center line Z—Z of the piston.

The fiber molding 35 is molded using a mold 37 shown in FIG. 13. The mold 37 comprises a mold body 40 including a cylindrical portion 39 rising from an upper surface of a base plate 38, and a pressing punch 41 slidably received in the cylindrical portion 39 from its upward opening. In the base plate 38, a plurality of drainage holes 42 are provided in a portion surrounded by the cylindrical portion 40, and a porous core 43 for shaping the hollow portion 36 is placed on the upper surface of the base plate 38 to cover inlet openings of the drainage holes 42. A cavity 44 for molding the fiber molding 35 is defined by the porous core 43 and the cylindrical portion 39.

The porous core 43 is formed using a coated sand comprising mullite and a resin and has an infinite number of open pores through which a liquid in a slurry molding material can penetrate. The porous core 43 comprises a flange-like base end 45, an intermediate portion 46 projecting from the base end 45, and an upper end 47 projecting from the intermediate portion 46. The base end 45 is closely fitted in the cylindrical portion 39. An outer peripheral surface k of the intermediate portion 46 and an upper end face m and an outer peripheral surface n of the upper end 47 are coated to seal the pores.

This ensures that the liquid permeability of a finely hatched portion, such as the outer peripheral surface k of the intermediate portion 46, is approximately zero. On the other hand, an upper annular end face g of the intermediate portion 46 and an upper annular end surface r of the base end 45 each have a relatively large liquid permeability, thus permitting sufficient fluid drainage.

The slurry molding material c comprises a blend of SiC whiskers and short alumina fibers mixed in equal amounts and dispersed in a liquid. The content of SiC whiskers and short alumina fibers is of 5 to 6% by weight each.

In forming the fiber molding 35, the slurry molding material c is poured into the cavity 44 and then pressed by the pressing punch 41 while removing the liquid in the molding material c from the drainage holes 42 through the porous core 43 by evacuation.

At this molding step, the running of the molding material c is developed to enter the upper annular end faces r and g of the base end 42 and the intermediate portion 46 in the porous core 43.

This ensures that the short fibers f are distributed in a substantially uniform manner over the entire cavity 44 and are oriented perpendicular to the pressing direction, thus forming the fiber molding 35.

In this case, the liquid permeability of the porous core 43 can be partially varied to increase the volume fraction of short fibers f in a portion having a higher liquid permeability and to decrease the volume fraction of the short fibers f in a portion having a lower liquid permeability.

In addition, it is possible to increase the density of the porous core 43 as a means for varying its liquid permeability by partially increasing the density.

FIG. 14 shows a porous core $43_1$ comprised of a porous core body 48 formed from the above-described coated sand, and a sealing member 49 added to the core body 48. The sealing member 49 comprises a plate-like portion 50 in close contact with an upper end of the porous core body 48, and a cylindrical portion 51 connected to a lower surface of the plate-like portion 50 and buried in the porous core body 48. An outer peripheral edge 51a at a lower end of the cylindrical portion 51 is substantially flush with an outer peripheral surface at an intermediate portion of the porous core body 48.

With such a construction, the liquid permeability is zero between the plate-like portion 50 of the porous core 43 and the outer peripheral edge 51a at the lower end of the cylindrical portion 51.

The sealing member 49 is formed from a metal material such as a stainless steel, a heat resistant rubber or the like.

In making the porous core $43_1$, the sealing member 49 is placed into the core and then heated, for example, to 300° C. for 10 minutes. Thereafter, the coated sand is placed into the core and maintained at 300° C. for 15 minutes, whereby it is hardened.

Figure 15:
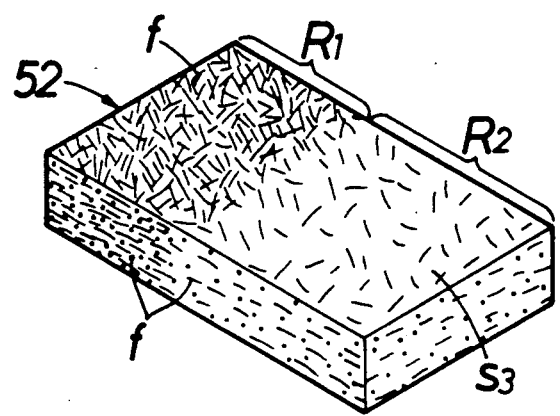
Figure 16:
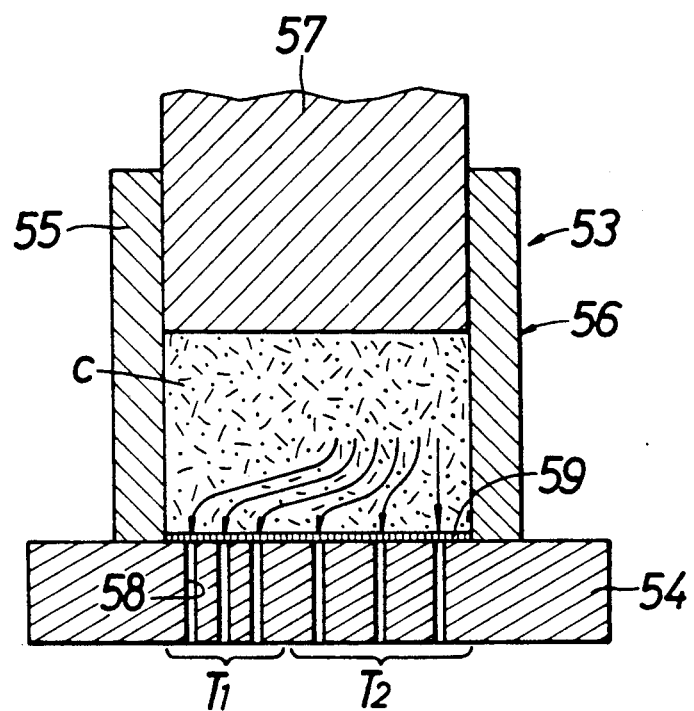

FIGS. 15 and 16 illustrate a seventh embodiment. FIG. 15 shows a rectangular parallelepiped fiber molding 52. Short fibers f forming the fiber molding 52 are oriented at random within the plane perpendicular to the pressing direction, including an upper surface $S_3$ of the fiber molding 52. The fiber molding 52 has a region $R_1$ having a higher volume fraction of short fibers at a half closer to one end lengthwise and a region $R_2$ having a lower volume fraction of short fibers at a half closer to the other end.

The fiber molding 52 is formed using a mold 53 shown in FIG. 16. The mold 53 comprises a mold body 56 including a rectangular cylindrical portion 55 rising on an upper surface of a base plate 54, and a pressing punch 57 slidably received in the rectangular cylindrical portion 55 from its upward opening. In the base plate 54, a plurality of drainage holes 58 are provided in a portion surrounded by the rectangular cylindrical portion 55, and a filter 59 is placed on the upper surface of the base plate 54 to cover the inlet openings of drainage holes 58.

The distribution density of drainage holes 58 is higher in a region $T_1$ at a half closer to one end and lower in a region $T_2$ at a half closer to the other end.

If the distribution density of the drainage holes 58 is varied in the above manner, the running of the slurry molding material c in the region $T_1$ having a higher density is vigorous at the step of forming the fiber molding 52, as compared with that in the region $T_2$ having a lower density. As a result, the volume fraction of short fibers f in region $T_1$ having the higher distribution density of drainage holes is higher than that in the region $T_2$ having the lower distribution density, thus providing the fiber molding 52.

Short fibers f of fiber molding 52 are oriented at random within the plane perpendicular to the pressing direction as described above, as a result of application of the pressing force by the pressing punch 57.

In this case, the short fibers used are a mixture of SiC whiskers and alumina fibers as in the example shown in FIG. 12.

FIGS. 17 to 20 illustrate an eighth embodiment.

Figure 17:
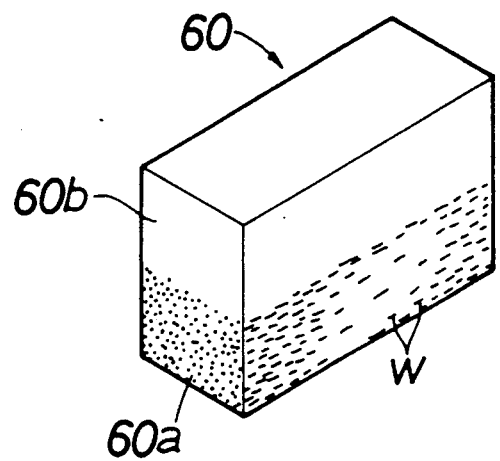

FIG. 17 shows a rectangular parallelepiped fiber-reinforced metal member 60 which comprises a composite portion 60a comprised of matrix and short fibers, and a simple portion 60b consisting of matrix alone. The matrix used is an aluminum alloy (a JIS AC2B-based alloy), and the short fibers used are SiC whiskers. The SiC whiskers are oriented in one direction, e.g., lengthwise along the metallic member 60 in the illustrated embodiment.

A process for producing the metallic member 60 will be described below with reference to FIGS. 18A to 20.

A mold 61, which was used, comprises a mold body 62, an upper vertically slidable pressing punch 63 mounted in the mold body, and a pair of first and second laterally slidable lateral pressing punches $64_1$ and $64_2$ mounted in the mold body below the upper pressing punch 63.

Figure 18A:
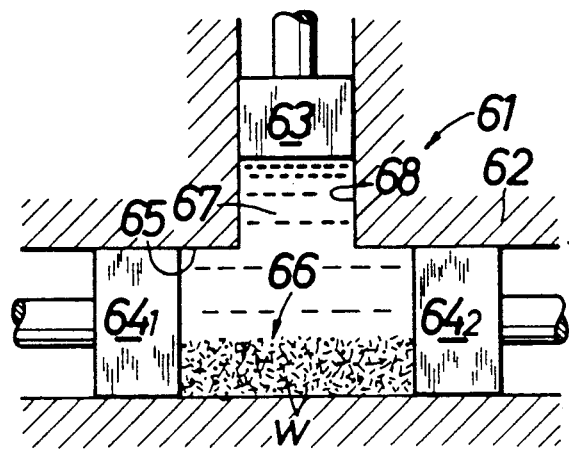
FIGS. 18A to 18C are views for explaining producing steps.
Figure 18B:
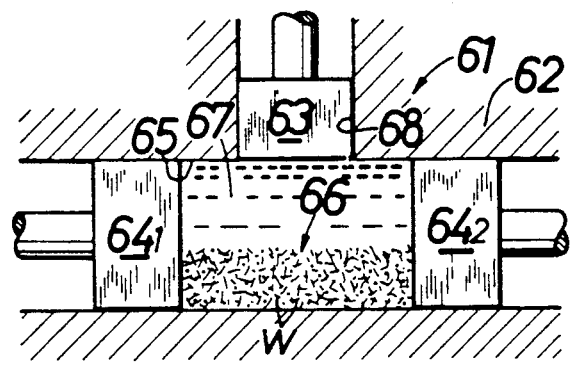
Figure 18C:
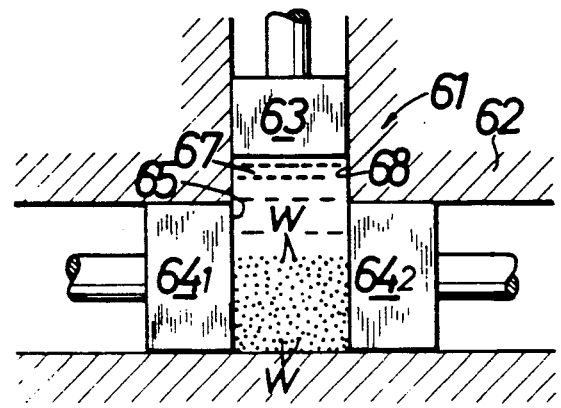

As shown in FIG. 18A, the mold 61 is first heated to about 360° C., and an aggregate 66 of an SiC whisker w heated to about 700° C. is placed into a bottom of a cavity 65 defined by the first and second lateral pressing punches $64_1$ and $64_2$. The volume fraction (Vf) of the SiC whisker w in the aggregate 66 is of about 15%, and no binder is used so that the SiC whisker may be readily disaggregated.

Then, a molten metal 67 of an aluminum alloy matrix at 760° to 780° C. is poured into the cavity 65, so that a portion thereof is located within a slide bore 68 for the upper pressing punch 63.

Figure 19:
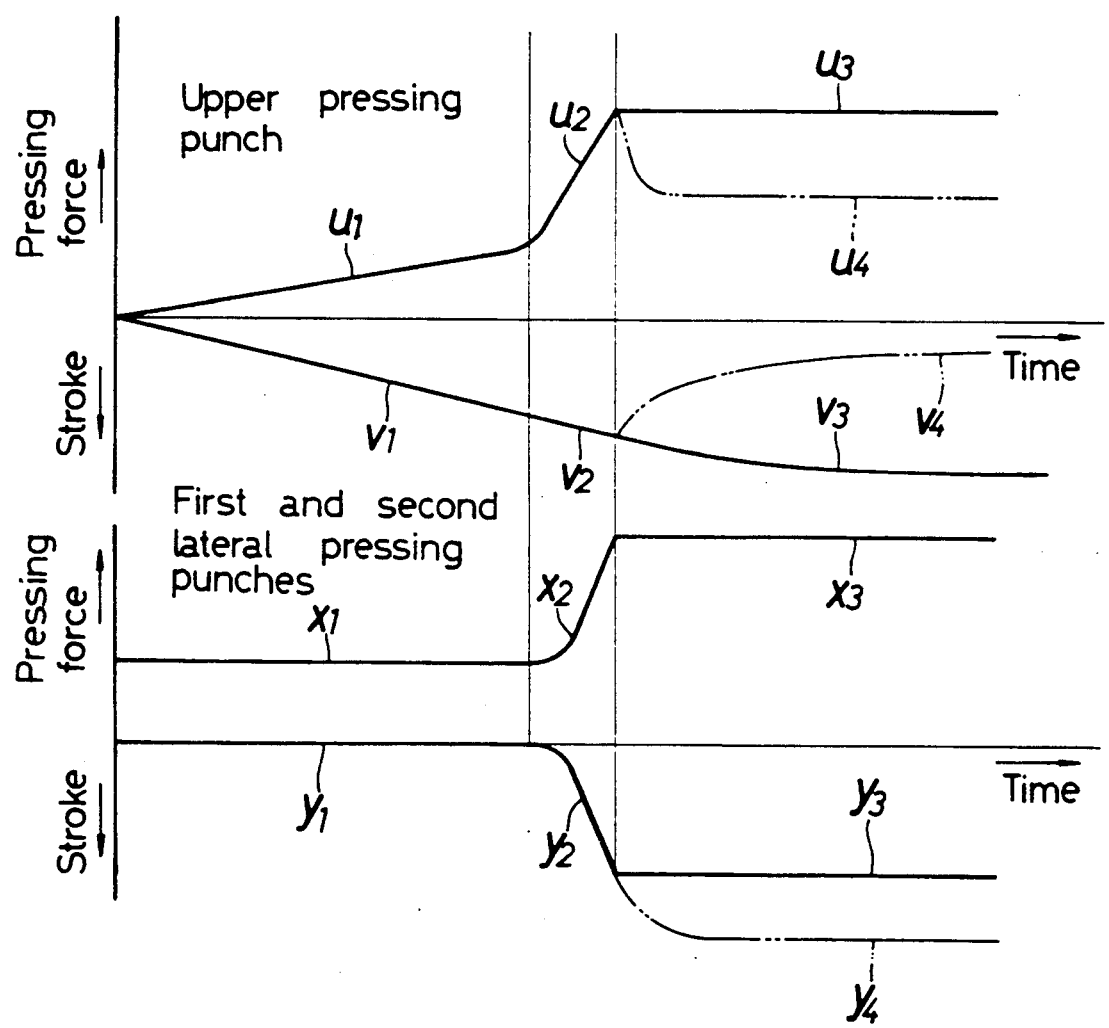

With the first and second lateral pressing punches $64_1$ and $64_2$ kept stationary, as shown by lines $x_1$ and $y_1$ in FIG. 19, the upper pressing punch 63 is moved down at a speed of about 20 mm/sec., as shown by lines $u_1$ and $v_1$ in FIG. 19, to slowly press the molten metal 67 so that the aggregate 66 is fully impregnated with the molten metal 67. The pressing force on the molten metal 67 at this time is of about 300 kg/cm². If the molten metal is slowly pressed, the molten metal can reliably permeate into the SiC whiskers w.

As shown by lines $u_2$ and $v_2$ in FIG. 19, the molten metal 67 is rapidly pressed by the upper pressing punch 63 so that the pressing force on the molten metal is increased to about 700 kg/cm². Immediately after the start of rapid pressing by the upper pressing punch 63, the first and second lateral pressing punches $64_1$ and $64_1$ are permitted to slide toward each other as shown by lines $x_2$ and $y_2$ in FIG. 19 to rapidly press the molten metal 67 with a pressing force exceeding 700 kg/cm², thereby completing the shaping.

Figure 20:
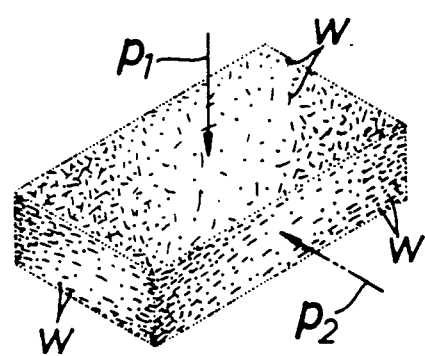

At this shaping step, the SiC whiskers w are initially oriented perpendicular to the pressing direction and are oriented at random within the plane perpendicular to the pressing force upon application of the pressing force $p_1$ of the upper pressing punch 4, as shown in FIG. 20. Then, the SiC whiskers w receive a pressing force $p_2$ of the first and second lateral pressing punches $64_1$ and $64_2$, so that those whiskers perpendicular to the pressing direction are maintained as they are while those not perpendicular to the pressing direction are reoriented so that they are perpendicular to the pressing direction $p_2$, whereby the SiC whisker w is all oriented in one direction.

In addition, the volume fraction of SiC whiskers w in the metallic member 60 is determined at the shaping step and is of about 20%. In this case, the aggregate 66 is fully impregnated with the molten metal 67 prior to the shaping, and hence, cracks are not produced in the resulting metallic member 60.

As shown in lines $u_3$, $v_3$, $x_3$ and $y_3$ in FIG. 19, the pressing forces of the upper pressing punch 63 and the first and second lateral pressing punches $64_1$ and $64_2$ are kept constant at a high level to prevent the generation of voids, while at the same time, providing a forging effect. This provides a densification of the metal structure of the matrix and an improvement in adhesion to the SiC whiskers w. Furthermore, it inhibits the generation of two-dimensional voids having a diameter of 5 to 20 μm, which may be produced due to the separation of hydrogen from a liquid or solid phase containing a supersaturated hydrogen before or after completion of solidification.

It should be noted that prior to keeping the force constant, the pressing punch 63 may be controlled to provide a reduced force as a back pressure load on the molten metal 67 in order to promote the deformability of the molten metal 67. Lines $v_4$ and $y_4$ in FIG. 19 correspond to the above-described line $u_4$.

Of course, the above producing process is applicable to the production of structural members such as connecting rods, pistons, piston pins, and various members such as band. Furthermore, it is not limited to the partial reinforcement in the above-described embodiments, but can be applied to the whole reinforcement.

Further, in controlling the orientation of the short fibers, a fluid material such as a slurry molding material containing short fibers or molten metal can be pressed from two different directions to orient the short fiber in any direction.

What is claimed is:

1. A process for molding a fiber molding for a fiber-reinforced composite material, the fiber molding having a semi-annular portion, comprising
    a first step of pouring a slurry molding material, which comprises short fibers dispersed in a liquid, into a first mold and then applying a primary pressing force to the molding material while removing the liquid to form an intermediate product having a semi-annular portion, wherein a direction of application of the primary pressing force is established parallel to a direction of a center line of the semi-annular portion, and
    a second step of placing the intermediate product into a second mold with a semi-circular float fitment being fitted in a semi-circular recess defined in the semi-annular portion of the intermediate product, and they applying a secondary pressing force to the intermediate product in a direction substantially perpendicular to the direction of the primary pressing force, while removing the liquid and permitting the float fitment to slide on the second mold, to thereby form the fiber molding comprising the semi-annular portion.

2. A process for molding a fiber molding for a fiber-reinforced composite material according to claim 1, wherein the fiber molding is for use in molding a connecting rod for an internal combustion engine, and the semi-annular portion serves as a reinforcing portion for a large end provided at one end of the connecting rod.

3. A process for molding a fiber molding for a fiber-reinforced composite material according to claim 1, wherein the semi-circular float fitment is placed in slide contact with the second mold at opposite semi-circular surfaces and a flat bottom surface of the float fitment, and is placed in the second mold with the flat bottom surface of the float fitment aligned with the direction of application of the secondary pressing force.

4. A process for molding a fiber molding for a fiber-reinforcing composite material, the fiber molding having an annular portion, comprising
    a first step of pouring a slurry molding material, which comprises short fibers dispersed in a liquid, into a first mold and then applying a primary pressing force to the molding material while removing the liquid to form an intermediate product having an annular portion, wherein a direction of application of the primary pressing force is established parallel to a direction of a center line of the annular portion, and
    a second step of placing the intermediate product into a second mold with a circular flat fitment being fitted in a circular recess defined in the annular portion of the intermediate product, and then applying a secondary pressing force to the intermediate production a direction substantially perpendicular to the primary pressing-direction, while removing the liquid and permitting the float fitment to slide at opposite ends thereof on the second mold, to thereby form the fiber molding comprising the annular portion.

5. A process for molding a fiber molding for a fiber-reinforced composite material according to claim 4, wherein the fiber molding is for use in molding a connecting rod for an internal combustion engine, and the annular portion serves as a reinforcing portion for a small end provided at one end of the connecting rod.

6. A process for molding a fiber molding for a fiber-reinforced composite material according to claim 4, wherein the circular float fitment is placed in slide contact with the second mold at opposite circular surfaces of the float fitment and is placed in the second mold with the circular surfaces of the float fitment aligned with the direction of application of the secondary pressing force.

7. A process for molding a fiber molding for a fiber-reinforced composite material, the fiber molding having a semi-annular portion, comprising
    a first step of pouring a slurry molding material, which comprises short fibers dispersed in a liquid, into a first mold and they applying a primary pressing force to the molding material while removing the liquid to form a primary intermediate product having a semi-annular portion, wherein direction of application of the primary pressing force is established parallel to a direction of a center line of the semi-annular portion,
    a second step of placing the primary intermediate product into a second mold with a semi-circular float fitment being fitted in a semi-circular recess defined in the semiannular portion of the primary intermediate product, and then applying a secondary pressing force t one of two opposite surfaces of the primary intermediate product in a direction substantially perpendicular to the direction of the primary pressing force, while removing the liquid and permitting the float fitment to slide on the second mold, thereby providing a secondary intermediate product, and
    a third step of placing the secondary intermediate product into a third mold with the semi-circular float fitment fitted in the semi-circular recess of the semiannular portion of the secondary intermediate product and then applying a tertiary pressing force to the other of the two opposite surfaces of the secondary intermediate product in a direction substantially perpendicular to the direction of the primary pressing force, to thereby form the fiber molding comprising the semi-annular portion.

8. A process for molding a fiber molding for a fiber-reinforced composite material according to claim 7, wherein the second and third steps are alternately repeated.

9. A process for molding a fiber molding for a fiber-reinforced composite material according to claim 7 or 8, wherein the fiber molding is for use in molding a connecting rod for an internal combustion engine, and the semi-annular portion serves as a reinforcing portion for a large end provided at one end of the connecting rod.

10. A process for molding a fiber molding for a fiber-reinforced composite material according to claim 7, wherein the semi-circular float fitment is placed in slide contact with the second mold at opposite semi-circular surfaces and a flat bottom surface of the float fitment, and is placed in the second mold with the flat bottom surface of the float fitment aligned with the direction of application of the secondary pressing force.

11. A process for molding a fiber molding for a fiber-reinforced composite material, the fiber molding having an annular portion, comprising a first step of pouring a slurry molding material, which comprises short fibers dispersed in a liquid, into a first mold and they applying a primary pressing force to the molding material while removing the liquid to form a primary intermediate product having an annular portion, wherein a direction of application of the primary pressing force is established parallel to a direction of a center line of the annular portion, a second step of placing the primary intermediate product into a second mold with a circular float fitment being fitted in a circular recess defined in the annular portion of the primary intermediate product, and then applying a secondary pressing force to one of two opposite surfaces of the primary intermediate product in a direction substantially perpendicular to the direction of the primary pressing force, while removing the liquid and permitting the float fitment to slide at opposite ends thereof on the second mold, thereby providing a secondary intermediate product, and a third step of placing the secondary intermediate product into a third mold with the circular float fitment being fitted in the circular recess of the annular portion in the secondary intermediate product and then applying a tertiary pressing force to the other of the two opposite surfaces of the secondary intermediate product in a direction substantially perpendicular to the direction of the primary pressing force, to thereby form the fiber molding comprising the annular portion.

12. A process for molding a fiber molding for a fiber-reinforced composite material according to claim 11, wherein the second and third steps are alternately repeated.

13. A process for molding a fiber molding for a fiber-reinforced composite material according to claim 11 or 12, wherein the fiber molding is for use in molding a connecting rod for an internal combustion engine, and the annular portion serves as a reinforcing portion for a small end provided at one end of the connecting rod.

14. A process for molding a fiber molding for a fiber-reinforced composite material according to claim 11, wherein the circular float fitment is placed in slide contact with the second mold at opposite circular surfaces of the float fitment, and is placed in the second mold with the circular surfaces of the float fitment aligned with the direction of application of the secondary pressing force.

* * * * *